(12) United States Patent
Saito (10) Patent No.: US 7,797,011 B2
(45) Date of Patent: Sep. 14, 2010

(54) COMMUNICATION METHOD AND COMMUNICATION EQUIPMENT IN THE POC SERVICE

(75) Inventor: Junya Saito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 11/718,472

(22) PCT Filed: Oct. 31, 2005

(86) PCT No.: PCT/JP2005/020011

§ 371 (c)(1),
(2), (4) Date: May 2, 2007

(87) PCT Pub. No.: WO2006/049128

PCT Pub. Date: May 11, 2006

(65) Prior Publication Data

US 2009/0028076 A1    Jan. 29, 2009

(30) Foreign Application Priority Data

Nov. 4, 2004    (JP) .............................. 2004-320745

(51) Int. Cl.
*H04B 7/00*    (2006.01)
*H04M 3/42*    (2006.01)
(52) U.S. Cl. ....................... 455/519; 455/518; 455/517; 455/416
(58) Field of Classification Search ................. 455/517, 455/518, 519, 416, 521
See application file for complete search history.

(56) References Cited

U.S. PATENT DOCUMENTS

| 7,155,248 | B2 * | 12/2006 | Idnani .......................... 455/519 |
| 7,359,725 | B2 * | 4/2008 | Bhutiani ...................... 455/518 |
| 7,415,284 | B2 * | 8/2008 | Hoover et al. ................ 455/518 |
| 7,499,720 | B2 * | 3/2009 | Idnani .......................... 455/519 |
| 7,522,932 | B2 * | 4/2009 | Park et al. .................... 455/518 |
| 7,577,454 | B2 * | 8/2009 | Park et al. .................... 455/518 |
| 7,593,359 | B2 * | 9/2009 | Eneroth et al. ............... 370/312 |

(Continued)

FOREIGN PATENT DOCUMENTS

JP    2004-322229    1/2004

(Continued)

OTHER PUBLICATIONS

International Search Report (PCT/JP2005/020011) dated Dec. 6, 2005.

(Continued)

*Primary Examiner*—Tilahun Gesesse
(74) *Attorney, Agent, or Firm*—Pearne & Gordon LLP (57)    ABSTRACT

The present invention aims at permitting users of the equipments to exchange mutually their own wills easily in a PoC service not to take a floor. In a PoC service that attains a half duplex talk session using a packet communication between the plurality of equipments via a PoC server, a PoC server 20 for controlling a communication relay among a plurality of equipments includes a managing unit 20a for managing the user equipments connected to the PoC server 20, an acquiring unit 20b for acquiring a key operation of each equipment as operation information, and a transmitting unit 20c for transmitting the acquired operation information to the equipments that the managing unit 20a manages.

6 Claims, 6 Drawing Sheets

AN INTERNAL CONFIGURATIVE VIEW OF A USER EQUIPMENT
IN AN EMBODIMENT OF THE PRESENT INVENTION

U.S. PATENT DOCUMENTS

2004/0224710 A1* 11/2004 Koskelainen et al. ........ 455/518
2005/0287997 A1* 12/2005 Fournier ..................... 455/415
2009/0280851 A1* 11/2009 Dostal et al. ................ 455/518

FOREIGN PATENT DOCUMENTS

WO          02/089501          11/2002

OTHER PUBLICATIONS

Technical Specification: Push-to-Talk over Cellular (PoC) User Plane; Transport Protocols; PoC Release 1.0; Transport Protocols V1.0.0 (Aug. 2003).

* cited by examiner

FIG. 1

AN INTERNAL CONFIGURATIVE VIEW OF A USER EQUIPMENT IN AN EMBODIMENT OF THE PRESENT INVENTION

FLOW OF DATA WHEN A KEY IS PRESSED

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype |   PT=APP=204  |            length             |
+-+-+-+-+-+-+-+-+-+-+-+-+-+-+-+-+-+-+-+-+-+-+-+-+-+-+-+-+-+-+-+-+
|                            SSRC                               |
+-+-+-+-+-+-+-+-+-+-+-+-+-+-+-+-+-+-+-+-+-+-+-+-+-+-+-+-+-+-+-+-+
|                         name (ASCII)                          |
+-+-+-+-+-+-+-+-+-+-+-+-+-+-+-+-+-+-+-+-+-+-+-+-+-+-+-+-+-+-+-+-+
|                     application-dependent data             ...|
+-+-+-+-+-+-+-+-+-+-+-+-+-+-+-+-+-+-+-+-+-+-+-+-+-+-+-+-+-+-+-+-+
```

RTCP PACKET FORMAT

FIG. 6

FLOW OF DATA WHEN A KEY PRESSING IS RELEASED

SEQUENCE WHEN A TALK SESSION IS STARTED

COMMUNICATION METHOD AND COMMUNICATION EQUIPMENT IN THE POC SERVICE

TECHNICAL FIELD

The present invention relates to a communication program and a communication equipment in the PoC (Push-to-Talk over Cellular) service.

BACKGROUND ART

In the half duplex communication such as the PoC service, or the like, each user takes the floor before such user starts the talking. Merely a single user can take this floor. Thus, a plurality of users cannot take the floor simultaneously. As a result, the user who does not take the floor cannot talk while another user who takes the floor is talking, and cannot notify another user of user's own intention.

Figure 11:
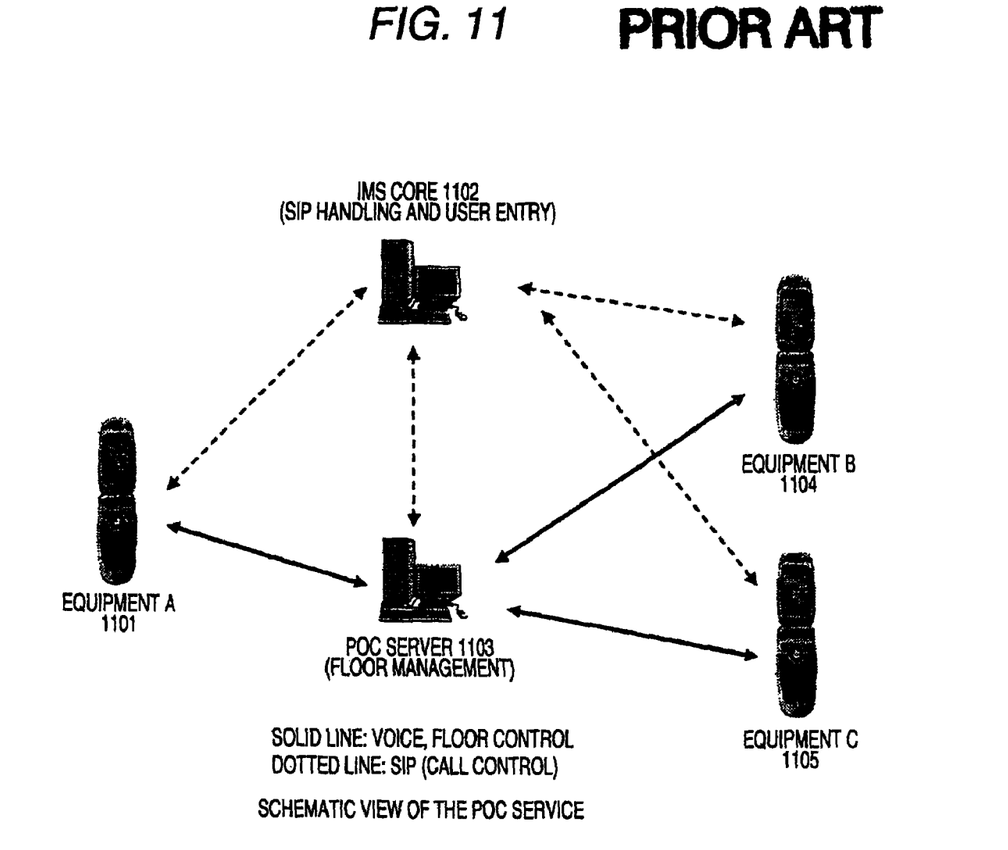
FIG. 11 A schematic view of the PoC service.

FIG. 11 shows a schematic view of the PoC service. A user equipment A 1101, a user equipment B 1104, and a user equipment C 1105 communicate with each other through an IMS (IP Multimedia Sub system) Core 1102 and a PoC Server 1103. The IMS Core 1102 handles the call control (SIP; Session Initiation Protocol) and the user entry, and the PoC Server 1103 manages the floor. In FIG. 11, a solid line denotes the voice and Floor control, and a dotted line denotes the SIP (call control).

Since the half duplex talking is carried out in the PoC service, the user can send user's voice to the other end of the line while such user is pressing the talking button after the connection with the other end of the line is established, and the user cannot hear the voice from the other end of the line while such user is pressing the talking button. Therefore, both users must send and get a short message reciprocally by pressing and releasing the talking button to hold a conversation with each other. Also, the PoC service can provide not only the one-to-one talking but also the simultaneous connection with plural persons on the other end of the line in a particular group. In this case, the user's voice is sent from the equipment at which the user is pressing the talking button to remaining equipments.

DISCLOSURE OF THE INVENTION

Problems that the Invention is to Solve

In this manner, since the PoC service is the half duplex communication, the user cannot express user's own opinion while any one of the attendants is talking. No trouble is caused by this situation in the one-to-one communication. However, when a large number of participants attend the talk session, a chance of the user expressing user's own will is reduced in proportion to the number of attendants. Also, when the user intends to get an opinion from all the attendants, all the attendants must take the floor to talk and thus it takes much time and effort.

Therefore, in the prior art, when the user wishes to notify the user's own will while any one of the attendants is talking, normally such user sends a message through another means such as the Internet mail, or the like different from the PoC service. In this case, the addresses of all members must be set to send a message to all the attendants. Also, when the user receives the message, such user must switch the software to another software different from the PoC to view the message. As a result, the user's operations become troublesome.

The present invention has been made in view of the circumstances in the prior art, and aims at providing a communication program and a communication equipment through which the users of equipments can easily exchange their own wills mutually in the PoC service not to take the floor.

Means for Solving the Problems

A communication program of the present invention controls a communication relay between a plurality of equipments in a PoC service that attains a half duplex talk session using a packet communication between the plurality of equipments, and causes a computer to function as a managing unit for managing the equipments connected to the server; an acquiring unit for acquiring a key operation of each equipment as operation information; and a transmitting unit for transmitting the acquired operation information to the equipments which are managed by the managing unit.

According to the above configuration, since the operation information indicating the key operations executed by respective equipments are transmitted to the equipments which are managed by the managing unit, the user of the equipment can grasp the contents of operations executed by the users of other equipments at the user's own equipment. Therefore, when the correspondence between the key operations and the transferred information is shared in advance among the users, the users of the equipments can easily send their own wills mutually not to take the floor.

Also, in the communication program of the present invention, the transmitting unit transmits transferred information corresponding to the acquired operation information to the equipments which are managed by the managing unit, while referring to a storing unit that correlates key operations with the transferred information. According to the above configuration, since the transmitting unit transmits the transferred information corresponding to the acquired operation information to the equipments which are managed by the managing unit, while referring to the storing unit that correlates the key operations with the transferred information, the user of the equipment can grasp the transferred information corresponding to the operations executed by the users of other equipments at the user's own equipment. Therefore, the user of the equipment can grasp immediately the user's wills of the other equipments.

Also, a communication equipment of the present invention for conducting a half duplex talk session using a packet communication with other equipments via a server into which the communication program is loaded, includes a transmitting unit for transmitting key operations of equipments to the server as operation information; and a receiving unit for receiving the operation information transmitted from the server, the operation information indicating the key operations of the respective equipments.

According to the above configuration, since the user of the equipment can receive the operation information indicating the key operations of respective equipments transmitted from the server, such user of the equipment can grasp the contents of operations done by the users of other equipments at the user's own equipment. Therefore, when the correspondence between the key operations and the transferred information is shared in advance among the users, the user of the equipment can transfer easily the user's own will without taking of the floor.

ADVANTAGES OF THE INVENTION

According to the present invention, since the operation information indicating the key operations done by the users of respective equipments are transmitted to the equipments which are managed by the managing unit, the user of the equipment can grasp the contents of operations executed by the users of other equipments at the user's own equipment. Therefore, when the correspondence between the key operations and the transferred information is shared in advance among the users, the user of the equipment can easily send their own wills mutually not to take the floor.

DESCRIPTION OF REFERENCE NUMERALS AND SIGNS 11 microphone
12 speaker
13 digit key
14 display portion
15 timer
16 Floor control portion
17 talking key
18 SIP control portion
18a transmitting unit
18b receiving unit
19 communication control portion
20, 32, 1103 PoC server
20a managing unit
20b acquiring unit
20c transmitting unit
31 user equipment (UE#1)
33 user equipment (UE#2)
71, 1001 user equipment (UE A)
72 PoC server A
73 PoC server B
74, 1002 user equipment (UE B)
1101 user equipment A
1102 IMS Core
1104 user equipment B
1105 user equipment C

BEST MODE FOR CARRYING OUT THE INVENTION

A PoC service capable of holding a half duplex talk session using a packet communication among a plurality of communication equipments via a PoC server will be explained hereinafter. In the PoC service, the PoC server manages presence information indicating which communication equipments are connected to the PoC server, by collecting identification information of the communication equipments connected to the PoC server.

First Embodiment

Figure 1:
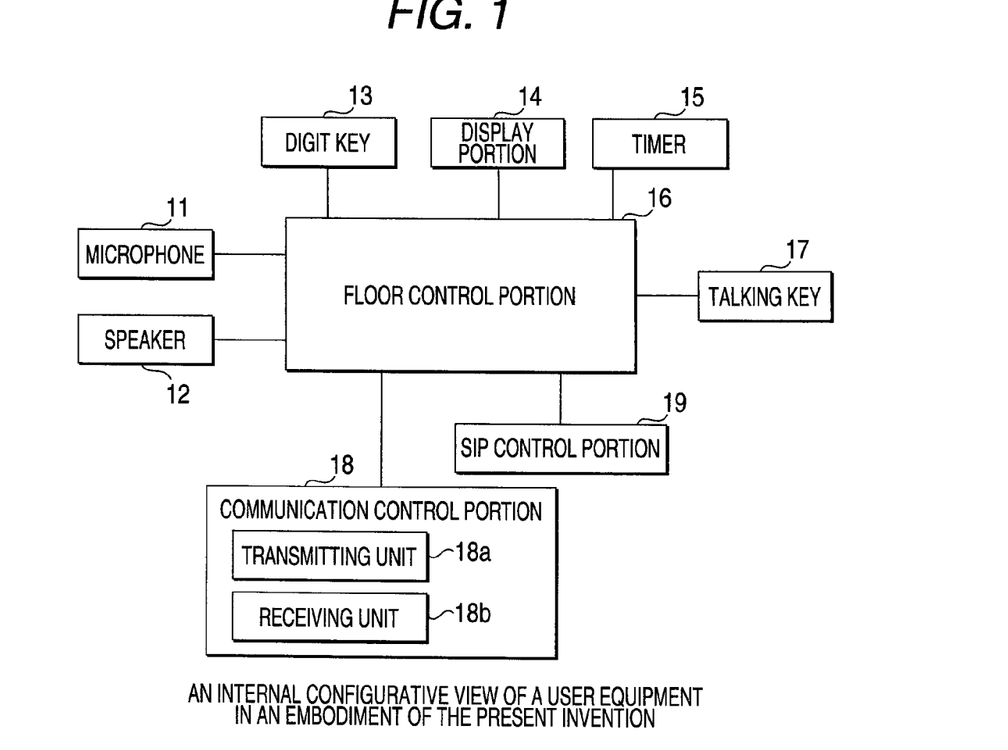
FIG. 1 An internal configurative view of a user equipment in a PoC service to explain a first embodiment of the present invention.

FIG. 1 is an internal configurative view of a user equipment in a PoC service to explain a first embodiment of the present invention. The user equipment shown in FIG. 1 includes digit keys 13, a display portion 14, a timer 15, a microphone 11, a speaker 12, a floor control portion 16, a talking key 17, an SIP control portion 19, and a communication control portion 18.

The digit keys 13 are keys used when the user performs the input operation. The display portion 14 is composed of a liquid crystal display, or the like. The timer 15 measures a time elapsed after the talk session is started. The microphone 11 is used to input the voice. The speaker 12 is used to output the voice. The floor control portion 16 manages the floor request and the response to this request. The talking key 17 is the key pressed when the user talks. The SIP control portion 19 controls a start of the talk session, and the like. The communication control portion 18 has a transmitting unit 18a and a receiving unit 18b, and controls a packet communication with the PoC server through the network. The transmitting unit 18a transmits the key operation of the user equipment to the PoC server as operation information. The receiving unit 18b receives the operation information indicating the key operation of respective user equipments transmitted from the PoC server. In this case, the talking key 17 may be provided as the exclusive key, or may be used in common with the camera shooting key, for example, or any other key may also be used as this talking key.

Figure 2:
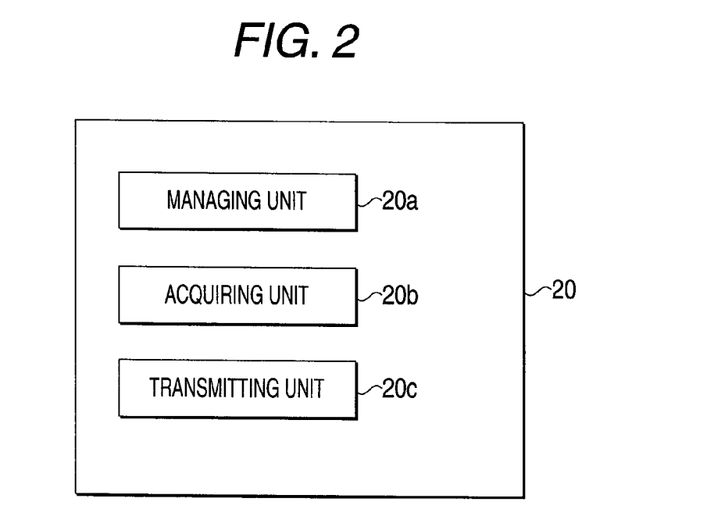
FIG. 2 A configurative view showing functions of a PoC server in the PoC service in the present embodiment.

FIG. 2 is a configurative view showing functions of the PoC server in the PoC service in the present embodiment. As shown in FIG. 2, a PoC server 20 controls a communication relay among a plurality of communication equipments in the PoC service that can hold the half duplex talk session using the packet communication among a plurality of communication equipments. The PoC server 20 has a managing unit 20a, an acquiring unit 20b, and a transmitting unit 20c. The managing unit 20a manages the communication equipments connected to the PoC server 20. The acquiring unit 20b acquires the key operation of respective equipments as the operation information. The transmitting unit 20c transmits the acquired operation information to the communication equipments which are managed by the managing unit 20a.

Figure 3:
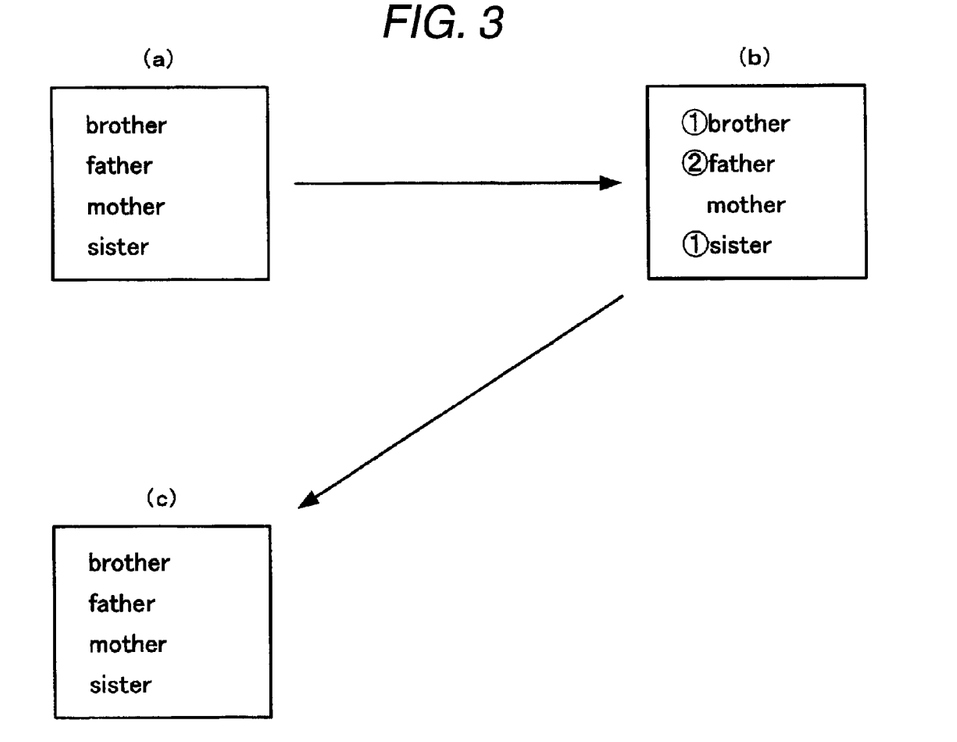
FIG. 3 A view showing a screen transition example displayed on a display portion 14 of a user equipment in the PoC service in the present embodiment.

FIG. 3 shows a screen transition example displayed on the display portion 14 of the user equipment in the PoC service in the present embodiment. In the present embodiment, the user equipment shown in FIG. 1 transmits the operation information indicating which digit key 13 is pressed when the user presses the digit key 13 to the PoC server, and transmits the operation information indicating that the pressing of that digit key 13 is released when the user releases the pressing of the digit key 13 to the PoC server.

As shown in FIG. 3(a), when the user equipments "brother", "father", "mother", and "sister" are holding the talk session via the PoC service, the users shares previously the correspondence between the key operations and the transferred information mutually because these users are instructed in advance that they press the digit key "1" when an answer to a question is "yes" whereas they press the digit key "2" when the answer is "no".

Then, assume that, after the question is posed, "Brother" presses the digit key "1", "Father" presses the digit key "2", "Sister" presses the digit key "1", and "Mother" presses none of the digit keys. In this case, the operation information indicating the contents of the key operation of respective equipments are transmitted to the PoC server, and then the operation information are transmitted from the PoC server to respective user equipments. Thus, screens of respective user equipments are updated automatically. Then, as shown in FIG. 3(b), "1" is displayed at "Brother", "2" is displayed at "Father", and "1" is displayed at "Sister", on the screens of respective user equipments. No display is given to "Mother". Also, when all members release the pressing of the digit key 13, the operation information are transmitted to respective equipments via the PoC server and, as shown in FIG. 3(c), the screens return to the screen shown before the digit key 13 is pressed.

Figure 4:
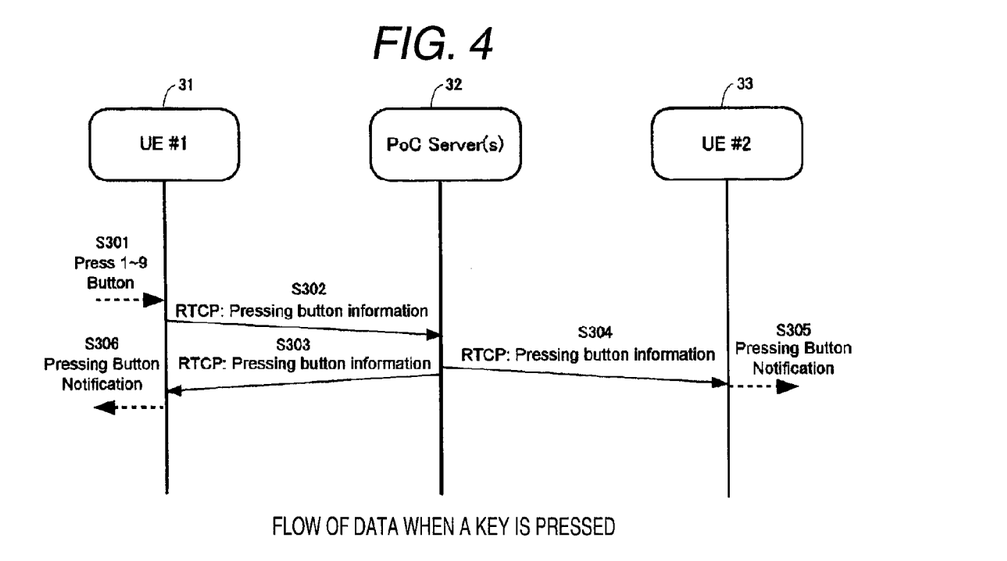
FIG. 4 A view showing a sequence until operation information is transferred to a user equipment 33 (UE#2) after a user equipment 31 (UE#1) presses a digit key 13.

FIG. 4 shows a sequence until the operation information is transferred to a user equipment 33 (UE#2) after a user equipment 31 (UE#1) presses the digit key 13.

When the user wishes to state the user's own intention, the user equipment 31 presses the digit keys "1" to "9" (Press 1 to 9 Button: step S301). At this time, the user equipment 31 adds the operation information (Pressing button information) indicating which digit key is pressed to a RTCP (Real-time transport Protocol/Control Protocol) packet and then transmits the information to a PoC server 32 (step S302).

When the PoC server 32 receives the operation information from the user equipment 31, this PoC server 32 transmits the RTCP packet including the operation information to respective user equipments 31, 33 that the PoC server 32 manages (steps S303, S304). Respective user equipments 31, 33 analyze the received RTCP packet and reflect the operation information on the screen (Pressing Button Notification: steps S305, S306).

Figure 5:
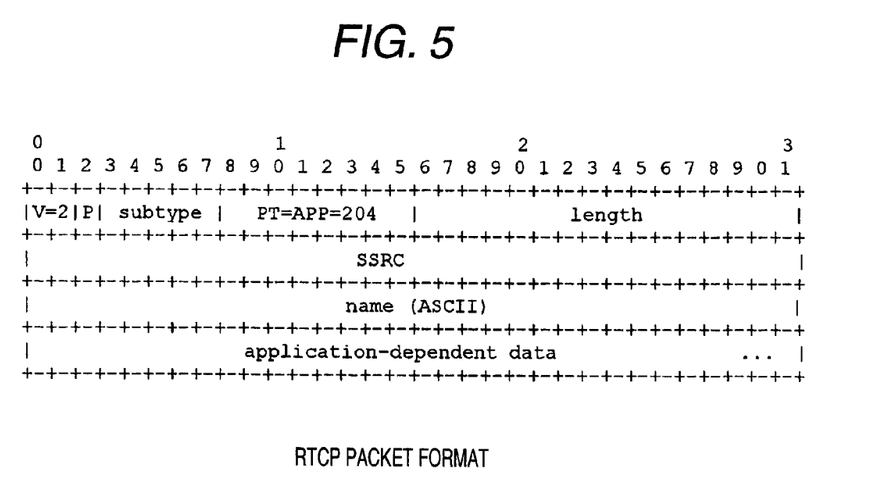
FIG. 5 An RTCP data format used in the sequence in FIG. 4.

FIG. 5 shows a RTCP data format used in the above sequence. This data format is formed in conformity with PoC Release 2.0.

In the present embodiment, the values undefined by PoC Release 2.0 out of values that the "Subtype" header of the RTCP data format can have are allocated to the operation information transmission/reception. The type of pressed key and the text displayed on each user equipment are defined such that they can be expressed in the "application-dependent data". Each user equipment analyzes the RTCP packet according to the definition and displays the information. Also, when the PoC server 32 has to rewrite RTCP data, only the "application-dependent data" portion should be rewritten.

Figure 6:
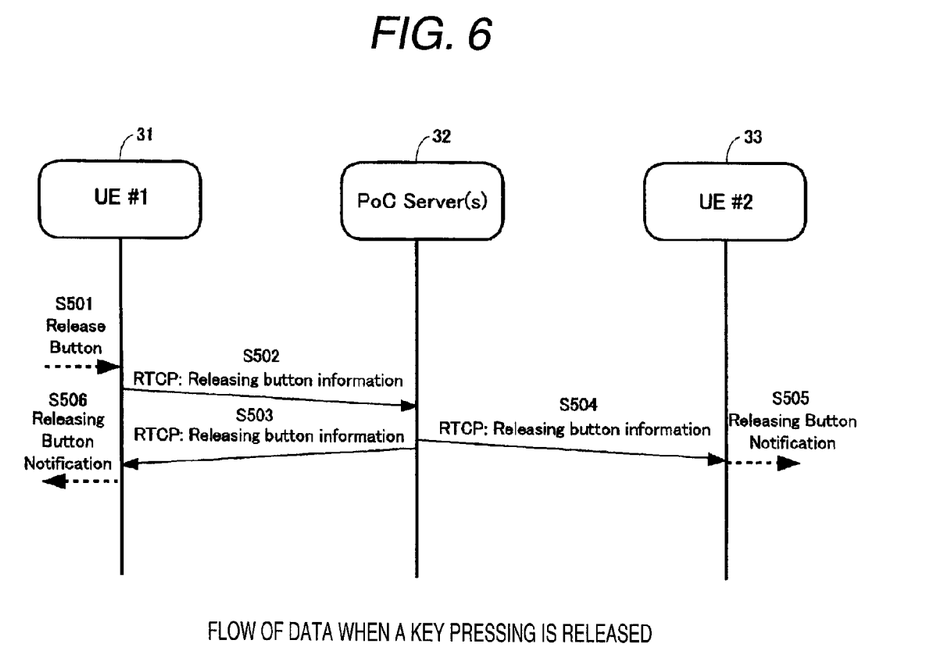
FIG. 6 A view showing a sequence until release information of the digit key 13 is transferred to the user equipment 33 (UE#2) after a pressing of the digit key 13 that the user equipment 31 (UE#1) is pressing is released.

FIG. 6 shows a sequence until release information of the digit key 13 is transferred to the user equipment 33 (UE#2) after the pressing of the digit key 13 that the user equipment 31 (UE#1) is pressing is released.

When the user equipment 31 ends the transfer of information by using the key operation, the user releases the pressing of the digit keys "1" to "9" (Release Button: step S501). At this time, the user equipment 31 adds the operation information (Releasing button information) indicating that the key pressing is released to the RTCP (Real-time Transport Protocol/Control Protocol) packet, and transmits the information to the PoC server 32 (step S502).

When the PoC server 32 receives the operation information from the user equipment 31, it transmits the RTCP packet containing the operation information to respective user equipments 31, 33 that the PoC server 32 manages (steps S503, S504). Respective user equipments 31, 33 analyze the received RTCP packet, and reflect the operation information on the screen (Releasing Button Notification: steps S505, S506). The RTCP data format used in the above sequence is similar to the data format shown in FIG. 5.

In this manner, according to the PoC service of the present embodiment, the correspondence between the key operations and the transferred information is shared in advance among the users and also the PoC server transmits the acquired operation information to the equipments which are managed by the PoC server. Therefore, the user of the equipment can grasp the contents of operations done by the users of other equipments at the user's own equipment. As a result, the user of the equipment can send easily the user's own will not to take the floor.

Second Embodiment

An internal configuration of the user equipment in the present embodiment is almost similar to the configuration shown in FIG. 1, and therefore their explanation will be omitted herein.

Figure 7:
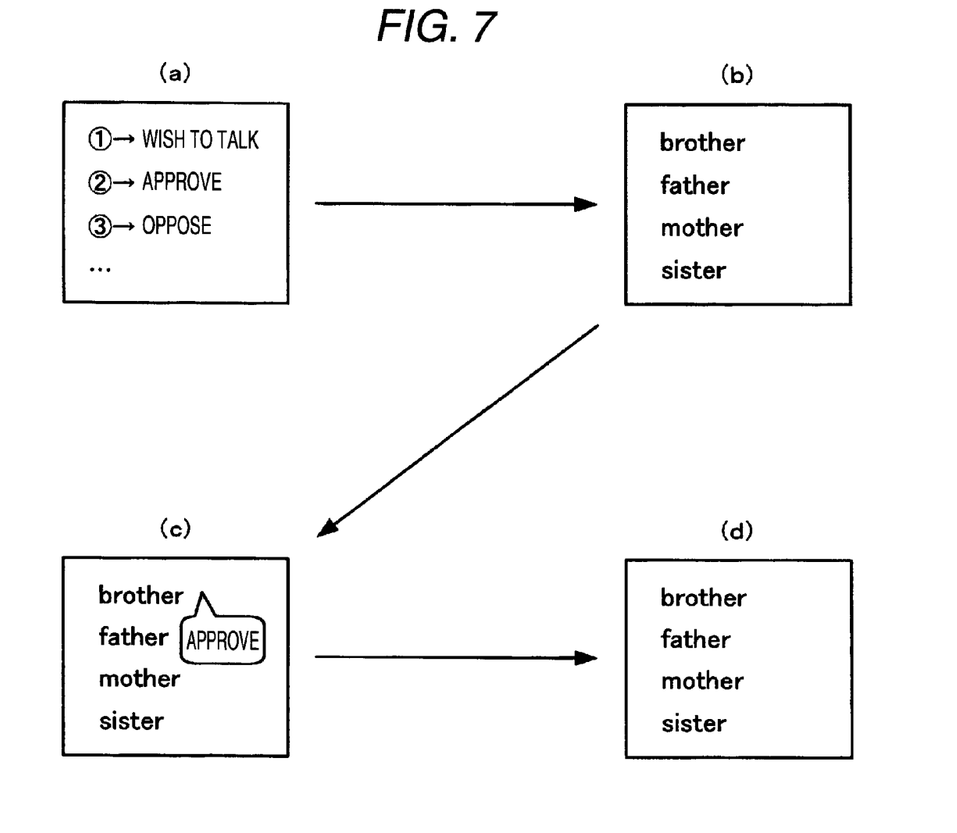
FIG. 7 A view showing a screen transition example displayed on the display portion 14 of the user equipment in the PoC service in the present embodiment.

FIG. 7 shows a screen transition example displayed on the display portion 14 of the user equipment in the PoC service in the present embodiment. In the present embodiment, the user equipment shown in FIG. 1 stores the correspondence between the key operations and the transferred information in its inside.

As shown in FIG. 7(a), the correspondence between the key operations and the transferred information to be stored in the equipment is set previously in the user equipment "Brother" such that a "wish to talk" message is transmitted when the digit key "1" is pressed, an "approve" message to a particular opinion is transmitted when the digit key "2" is pressed, and an "oppose" message to a particular opinion is transmitted when the digit key "3" is pressed.

When the user equipments "Brother", "Father", "Mother", and "Sister" start the talking (talk session) by the PoC service, first the characters to identify each equipment, or the like are displayed on the screens of all user equipments, as shown in FIG. 7(b).

Then, when the digit key "2" is pressed at the "Brother", the operation information indicating the digit key "2" is pressed and the transferred information "approve" corresponding to this operation information are transmitted to all equipments via the PoC server. Then, as shown in FIG. 7(c), a balloon indicating the transferred information "approve" is displayed on the screens of all equipments. Also, when the pressing of the digit key "2" is released by "Brother", the operation information indicating the pressing of the digit key "2" is released is transmitted to all equipments via the PoC server. Then, as shown in FIG. 7(d), a balloon disappears from the screens of all equipments.

Then, a method of causing a plurality of user equipments to share the correspondence between the key operations and the transferred information mutually will be explained hereunder. Because the correspondence between the key operations and the transferred information is shared among all equipments, other equipments can grasp the transferred information when only the operation information is transmitted to them.

Figure 8:
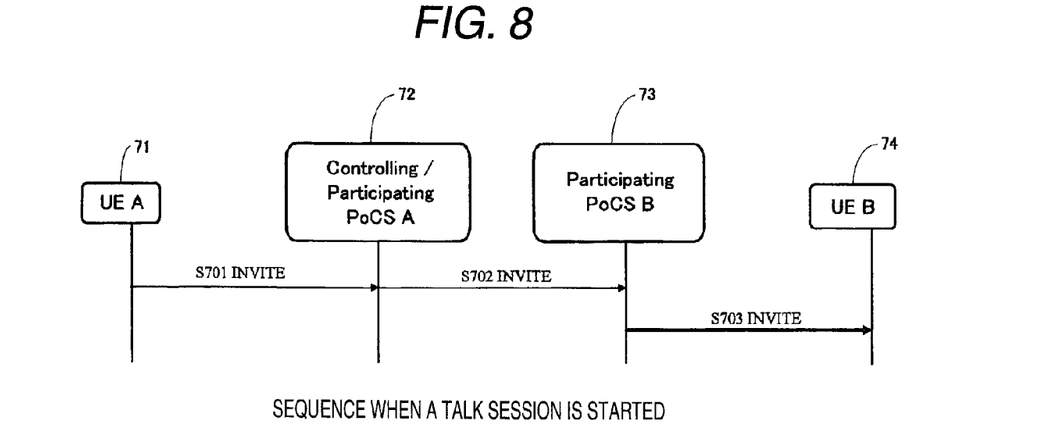
FIG. 8 A sequence diagram showing a method (A) of causing a plurality of user equipments to share a correspondence between key operations and transferred information.

FIG. 8 is a sequence diagram showing a method (A) of causing a plurality of user equipments to share the correspondence between the key operations and the transferred information with each other. In the method (A), the correspondence between the key operations and the transferred information is described in a body portion of the SIP invite signal (SIP INVITE) transmitted when the talking is started (the talk session is started) through the PoC service, and is transmitted.

For example, assume the case where the correspondence between the key operations and the transferred information is defined by a user equipment 71 (UE A). At this time, correspondence information indicating the correspondence between the key operations and the transferred information is transferred to a user equipment 74 (UE B) through following procedures. The user equipment 71 describes the correspondence information in the body portion of the INVITE message and transmits this information to a PoC server 72 (step S701).

The PoC server 72 transmits the INVITE message to which the correspondence information is added to a PoC server 73 (PoCS A) (step S702). The PoC server 73 transmits the INVITE message to which the correspondence information is added to the user equipment 74 (step S703). When the user equipment 74 receives the INVITE message, it analyzes the received message and forms the correspondence information.

Subsequently, respective user equipments form the RTCP packet by using the operation contents and the generated correspondence information, and transmit the packet to respective user equipments. At this time, since the correspondence information is held by respective user equipments, there is no need to add the transferred information specified by referring to the correspondence information to the RTCP packet. In this case, an amount of information to be transmitted can be reduced. Also, the correspondence information held by respective user equipments is abandoned when the talking via the PoC service is ended.

In this manner, according to the PoC service of the present embodiment, the operation information that the PoC server acquires and the transferred information corresponding to the operation information are transmitted to the equipments which are managed by the PoC server. Therefore, the user of the equipment can grasp the transferred information corresponding to the operation done by the users of other equipments at the user's own equipment. As a result, the user of the equipment can grasp immediately the wills of the other users who do not take the floor.

Third Embodiment

An internal configuration of the user equipment in the present embodiment is almost similar to the configuration shown in FIG. 1, and therefore their explanation will be omitted herein.

Figure 9:
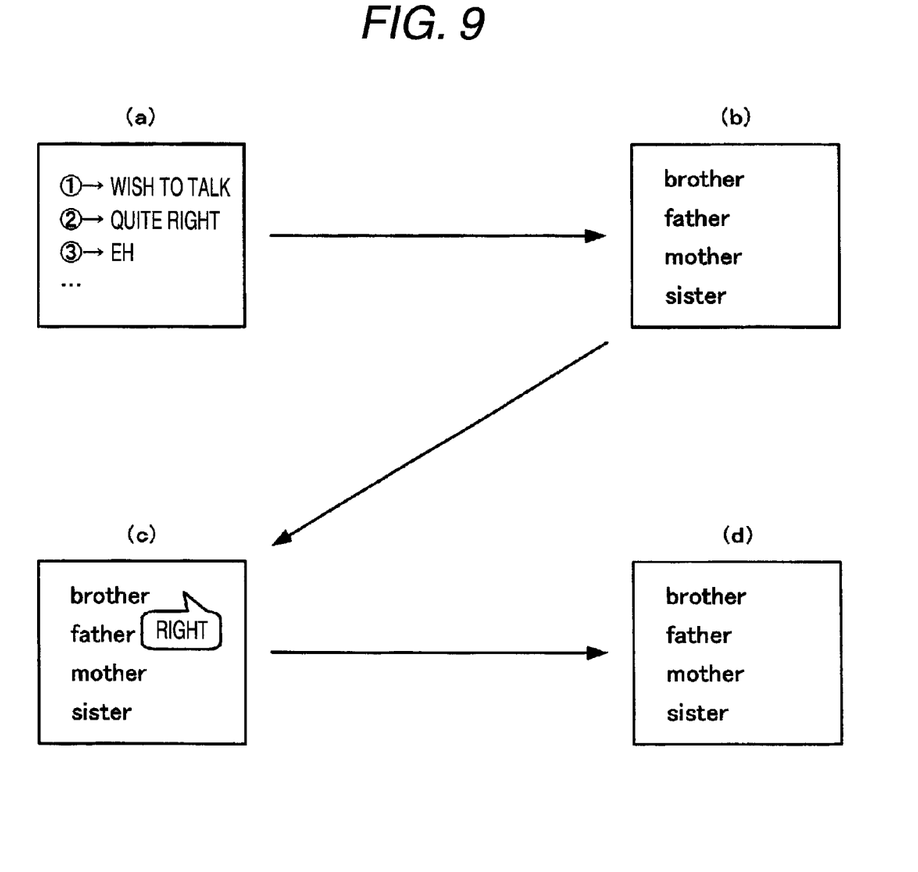
FIG. 9 A view showing a screen transition example displayed on the display portion 14 of the user equipment in the PoC service in the present embodiment.

FIG. 9 shows a screen transition example displayed on the display portion 14 of the user equipment in the PoC service in the present embodiment. In the present embodiment, the talk session (conference held by a plurality of equipments in the PoC service) group is set. In the present embodiment, set in advance every talk session is shared among a plurality of equipments.

FIG. 9(a) shows a screen of a session owner who sets the group. The session owner is the user who has an authority to set the correspondence between the key operations and the transferred information being used in that group. An example where the message "wish to talk" is correlated previously with the digit key "1", the message "quite right" is correlated with the digit key "2", and the message "eh" is correlated with the digit key "3" is given hereunder.

When the user equipments "Brother", "Father", "Mother", and "Sister" comprise a group and the talk session is started, the characters to identify respective equipments, and the like are displayed on the screens of all user equipments, as shown in FIG. 9(b). When the user who starts the talk session attends the session, the correspondence information indicating the correspondence between the key operations and the transferred information is transmitted to the PoC server.

When the digit key "2" is pressed by "Brother", the operation information indicating that the digit key "2" is pressed is transmitted to other all equipments via the PoC server. Then, as shown in FIG. 9(c), a balloon indicating the transferred information "quite right" corresponding to the operation information is displayed in a position "Brother" on the screens of all equipments. Also, when the pressing of the digit key "2" is released by "Brother", the operation information indicating that the pressing of the digit key "2" is released is transmitted to other all equipments via the PoC server. Then, as shown in FIG. 9(d), a balloon disappears from the screens of all equipments.

Figure 10:
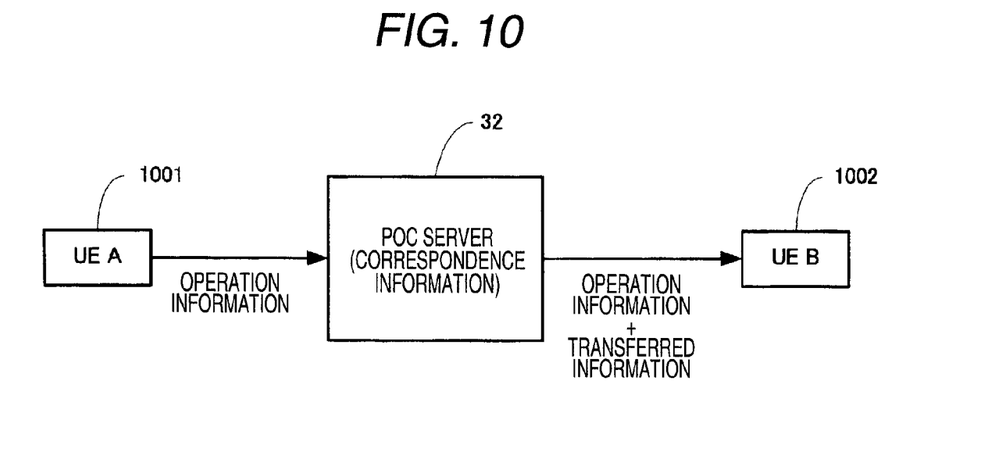
FIG. 10 An explanatory view showing a method (B) of causing a talk session group to share a correspondence between key operations and transferred information.

FIG. 10 is an explanatory view showing a method (B) of causing the talk session group to share the correspondence between the key operations and the transferred information. In the method (B), the session owner adds the correspondence information indicating the correspondence between the key operations and the transferred information to the group information as the attribute, and saves this correspondence information in a PoC server 32 when the user equipment enters into the group.

When the operation information is transmitted from a user equipment 1001 (UE A) to the PoC server 32 (a point of time in step S302 in FIG. 4) while the group possessing the correspondence information is holding the talk session through the PoC service, the PoC server 32 adds the corresponding transferred information to the received operation information by referring to the correspondence information held in its inside, and then transmits resultant information to a user equipment 1002 (UE B).

In this manner, according to the PoC service of the present embodiment, the PoC server transmits the acquired operation information and the transferred information corresponding to the operation information are transmitted to the equipments which are managed by the PoC server. Therefore, the user of the equipment can grasp the transferred information corresponding to the operations done by the users of other equipments in the group at the user's own equipment. As a result, the user of the equipment can grasp immediately the wills of the other users who do not take the floor. Also, according to the PoC service of the present embodiment, since the session owner restricts the transferred information to the contents being set beforehand, the improper talking (NG word), or the like can be eliminated.

The present invention is explained in detail with reference to the particular embodiments as above. But it is apparent for those skilled in the art that various variations and modifications can be applied without departing from a spirit and a scope of the present invention.

This application is based upon Japanese Patent Application (Patent Application No. 2004-320745) filed on Nov. 4, 2004; the entire contents of which are incorporated herein by reference.

INDUSTRIAL APPLICABILITY

According to the present invention, since the operation information indicating the key operations done by the users of respective equipments are transmitted to the equipments which are managed by the managing unit, the user of the equipment can grasp the contents of operations done by the users of other equipments at the user's own equipment. Therefore, the present invention possesses such an advantages that, when the correspondence between the key operations and the transferred information is shared in advance among the users, the users of the equipments can exchange mutually their wills easily without taking the floor, and is useful to the communication program and the communication equipment in the PoC service, and the like.

The invention claimed is:

1. A communication method of controlling a communication relay between a plurality of equipments in a PoC service which attains a half duplex talk session using a packet communication between the plurality of equipments, wherein each equipment comprises a talking key and at least one operation information transmitting key, the method comprising:

managing the equipments connected to the server, wherein one of the plurality of equipments has taken "the floor" in the half duplex talk session;

acquiring, as operation information, a key operation of the operation information transmitting key of at least one of the plurality of equipments that has not taken "the floor" in the half duplex talk session while said one of the plurality of equipments has "the floor" in the half duplex talk session;

transmitting the acquired operation information to the equipments which are managed by a managing unit; and displaying the operation information on a screen of said one of the plurality of equipments that has "the floor" and/or on a screen of at least another one of the plurality of equipments that has not taken "the floor".

2. The communication method according to claim 1, wherein transferred information corresponding to the acquired operation information is transmitted to the equipments in the transmitting process, while referring to a storing unit which stores key operations and the transferred information which are correlated to each other.

3. A communication equipment for conducting a half duplex talk session using a packet communication with other equipments via a server into which the communication method according to claim 1 is loaded, comprising:

a transmitting unit that transmits key operations of said communication equipment to the server as operation information; and a receiving unit that receives the operation information transmitted from the server, the operation information indicating the key operation of respective equipments.

4. The communication method according to claim 1, wherein the acquired operation information is transmitted to all of the equipments which are managed by the managing unit.

5. The communication method according to claim 4, wherein the transmitted operation information is displayed on each screen of said all of the equipments to share the operation information among said all of the equipments.

6. The communication method according to claim 1, wherein when one operation information transmitting key is pressed, the operation information indicating that the pressed key is pressed is transmitted, and when the pressed key is released from pressing, the operation information indicating that the pressed key is released is transmitted.

* * * * *